Jan. 11, 1966  YOJI OGIMOTO  3,228,042
COLLAPSIBLE FLOATING BODY
Filed May 26, 1964  7 Sheets-Sheet 4

Jan. 11, 1966          YOJI OGIMOTO          3,228,042
                   COLLAPSIBLE FLOATING BODY
Filed May 26, 1964                        7 Sheets-Sheet 6

INVENTOR.
BY *Yoji Ogimoto*

INVENTOR.

United States Patent Office 3,228,042
Patented Jan. 11, 1966

3,228,042
COLLAPSIBLE FLOATING BODY
Yoji Ogimoto, Nagoya-shi, Aichi, Japan, assignor to Sei-ichi Yamaguchi, Higashi-ky, Osaka, Japan
Filed May 26, 1964, Ser. No. 370,171
Claims priority, application Japan, June 6, 1963, 38/29,571; Apr. 8, 1964, 39/19,696
5 Claims. (Cl. 9—2)

The present invention relates to a structure which makes it possible to collapse floating bodies, particularly rowboats whose propulsive resistance is desired to be minimized.

The main and ultimate object of the invention is to provide a collapsible floating body of excellent strength which, in collapsed condition, assumes a flattened and superimposed form and yet, in operative condition, can be used in streamlined form having minimum propulsive resistance.

In the conventionaly known collapsible floating body such for example as a rowboat or flatboat, the shape which the body will take cannot but be limited by the collapsible structure of the body when it is expanded, because the bends for collapsing purpose present straight lines, producing propulsive properties extremely inferior to those of uncollapsible boats.

Also, the conventional collapsible floating body has many other disadvantages from the viewpoint of strength, and thus is not practically convenient.

The above-mentioned disadvantages inherent in the conventional floating bodies have heretofore been regarded as inevitable situations as a result of attaining collapsibility, because it has been generally considered that the collapsibility of floating bodies can be attained only by allowing the bends for collapsing to assume straight lines.

The invention, which aims at eliminating said disadvantages, is characterized, above all, by the provision of an outer wall, for a floating body, curved in three dimensions in such a manner that portions composed of relatively hard resilient plates are so constructed as to be collapsible and expandable along bend or fold lines curved along two dimensions, said collapsible and expandable portions being interconnected at least at spaced locations, the joining line between said portions being so constructed as to be water-sealed when the portions are in expanded condition, the parts on both sides of said bends being adapted to become flattened or substantially flattened when in collapsed condition.

That is to say, the actions of collapsing and expanding along two-dimensional fold lines, can be obtained by using relatively hard but resilient plates and by arranging the plates to be connected at at least spaced locations along thin bend or fold lines.

The outer wall, at bends or folds, freely defines a three-dimensional curved surface owing to the above-mentioned arrangement of the bends or folds.

Thus, a collapsible floating body according to the invention makes it possible not only to decrease propulsive resistance in the same manner as in the case with a non-collapsible floating body such as a rowboat, but to necessarily allow, in either of the expanded and the collapsed conditions, internal stresses to remain in the bends, thereby stressing the materials to increase the strength thereof.

The structure of a collapsible floating body to which the invention relates makes it possible, as one of the features thereof, to provide a boat that is capable of being divided in lengthwise directions into a plurality of parts, and which, after so divided, can be put together to provide the original form. In this case, if use is made of a resilient band-like element of U-shaped cross-section removably clamped over the gunwale, this will not only improve the sense of the boater's finger-touch to the gunwale but also assure the safety of the abutting of the boat against the shore, a pier, or another boat.

Furthermore, since such band-like element is freely removable, it can be replaced depending upon the degree of wear and damage thereof so that it can be very conveniently used. Particularly, if such band-like element is utilized for a collapsible boat, it not only covers the junctures on the gunwale, to give an impression of unity as a whole, but protects the boater's body from the junctures.

Also, if use is made of a crown-like member having its inner part shaped substantially similarly to the outer configuration of the bow part of said collapsible boat, said crown-like member removably fitted over said bow part and being provided with an engaging means such as a wire, then the structure will become more rugged than in the case of attaching a wire directly to the bow part, so that said engaging means can be reliably utilized.

That is to say, as the boat is collapsible, its bow part tends to be weak. If such engaging means is attached directly to the bow part, the concentration of force will occur in such weak parts. But by using said crown-like member, it is possible to reinforce the bow, thereby perfecting, in strength, the coupling between the engaging means and the boat body, thus providing a collapsible boat which is rugged as a whole and easy to use.

Another feature of a collapsible floating body according to the invention resides in that a resilient element is provided at least on either of the surfaces which, at the time of collapsing, are caused to be spaced apart from each other at the bends along two-dimensional curves and which, at the time of expanding, are caused to be opposed to each other. At the time of expanding, such resilient element will be pressed against both of said surfaces thereby assuring water-sealing at the joints.

A collapsible floating body according to the invention will now be described with reference to some embodiments thereof shown in the accompanying drawings, in which.

Figure 1:
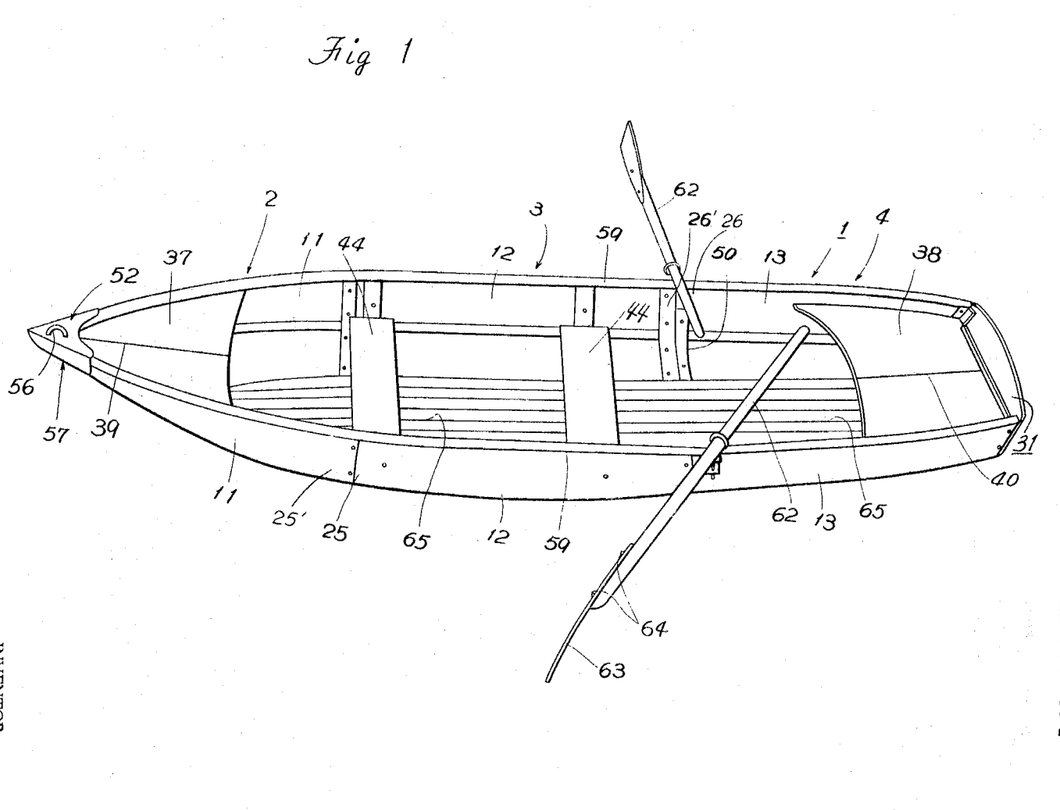
FIG. 1 is a perspective view of a whole assembly.
Figure 11:
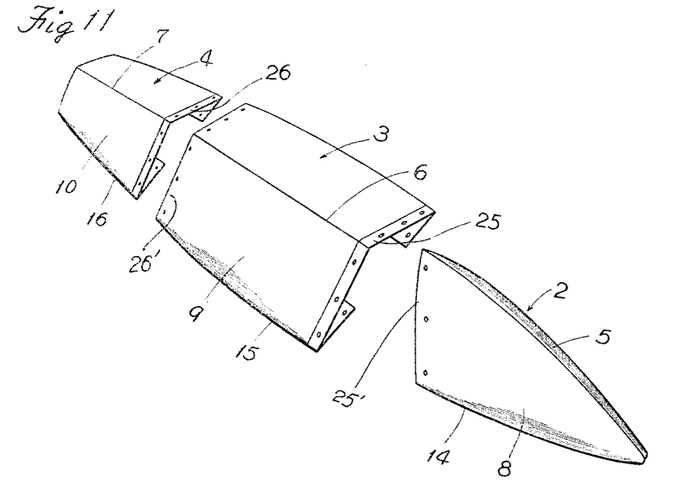
FIG. 11 is a perspective view of a boat body disassembled into three parts, showing a position taken at the first step of collapsing.
Figure 12:
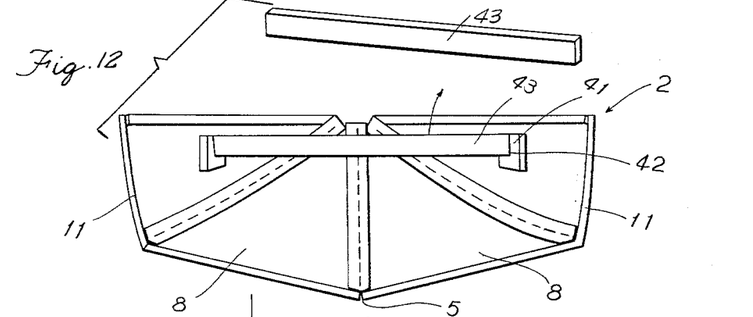
FIGS. 12 to 15 are rear views showing the consecutive steps of disassembling and collapsing a bow part.
Figure 13:
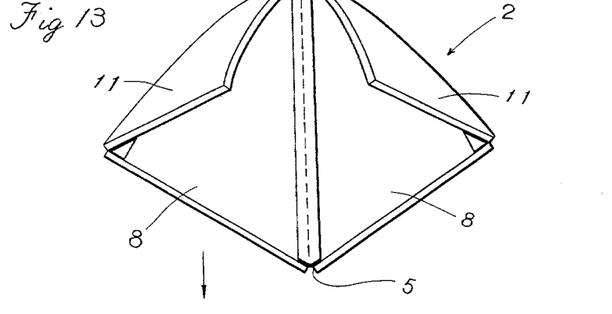
Figure 14:
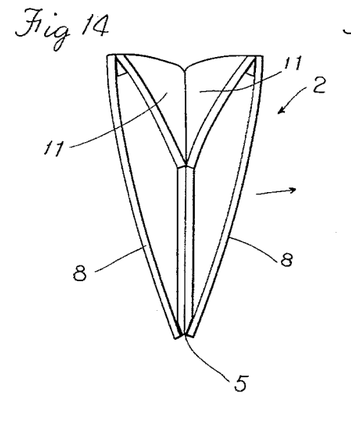
Figure 15:
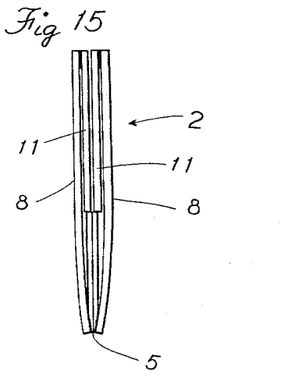

A boat body 1 consists of three longitudinally divided parts: a bow part 2; truck part 3 and stern part 4, these parts, as shown in FIG. 1 and 11, respectively having bends or folds 5, 6 and 7 extending lengthwise of the boat, and also connection folds between boat bottom boards 8, 9, 10 and boat side plates 14, 15 and 16. The said bow part 2, trunk part 3 and stern part 4 are each composed of a relatively hard resilient plate (for example, special plywood or the like). The fold or hinge 5 of the bow part 2 and the folds 14, 15 and 16 respectively present an outwardly projecting curve, and are so constructed as to form a three-dimensional outer curved wall when in assembled condition as shown in FIG. 1.

Figure 16:
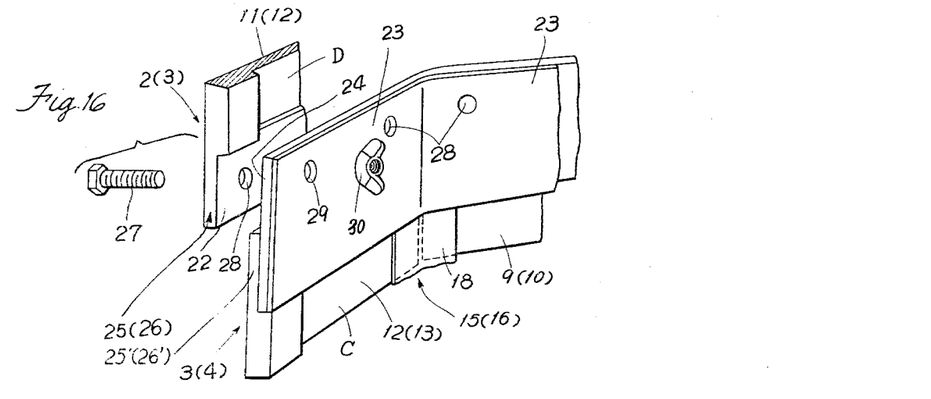
FIGS. 16 and 17 are perspective views showing how adjacent parts of a boat body are interconnected.
Figure 18:
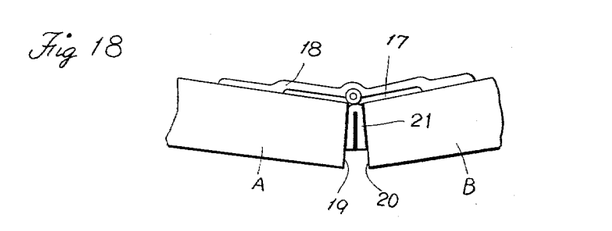
FIGS. 18 and 19 are plan views of the connecting or hinge elements of the boat body.
Figure 19:
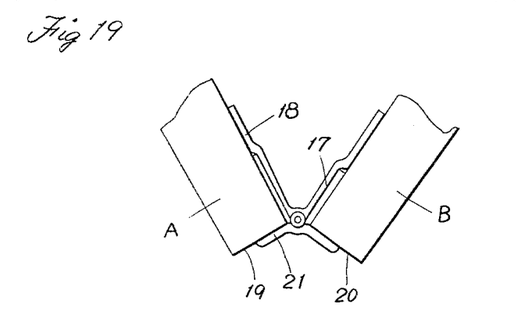
Figure 20:
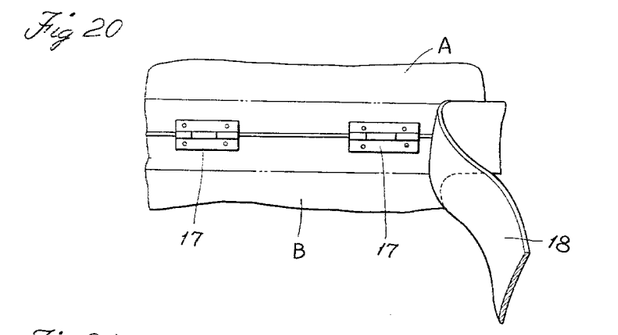
FIG. 20 is an elevation view of a connecting element of the boat body, showing a water-proof film partially stripped therefrom.

As shown in FIGS. 18 through 20, the above-mentioned folds 5, 6, 7 and 14, 15 and 16 are so arranged that each of bottom plates positioned in either side of each bend or both the bottom plates and side plates A and B are collapsibly interconnected by means of internally provided hinges 17. Such hinges 17 are arranged at spaced intervals longitudinally of the bends. Furthermore, in order to cover the hinges 17, a water-proof resilient band-like element 18 is applied to the inner surfaces of both side plates A and B. Between the mutually opposed edge surfaces 19 and 20 of side plates A and B, there is provided a double-folded water-proof resilient band-like element 21 in such a manner that the folded edge thereof abuts against the hinges 17, thereby further assuring a water-tight seal when the bends are expanded. The joint portions 25′, 25 between the bow part 2 and trunk part 3, and the joint parts 26′, 26 between the trunk part 3 and stern part 4, respectively, are such that, as shown in FIGS. 11 and 16, from the inner surface of one part C of the joint parts 25, 25′ and 26, 26′ to the inner surface 22 of the other part D there extends a band-like metal plate 23 which is disengageably securable to the two parts, said band-like metal plate 23 being provided with a water-tight resilient film 24 applied to the outer surface thereof. For the water-tight resilient film 24, use is made of a single continuous film at one of the connecting parts, while the said band-like metal plate 23 is divided into two sections at folds 6, 7, 15 and 16 so that it may not interfere with folding operation. At the places where the band-like metal plate 23 abuts against the connected member D, there are provided holes 28 and 29 into which are inserted bolts 27 passing through the water-tight resilient film 24. 30 indicates a thumb nut threadedly engaging the mating bolt 27 thereby connecting and tightening the joined parts at the joints 25, 25′ and 26, 26′.

Figure 9:
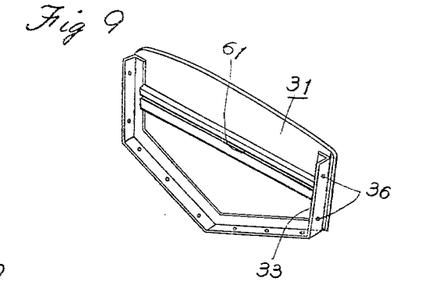
FIG. 9 is perspective of a transom.
Figure 17:
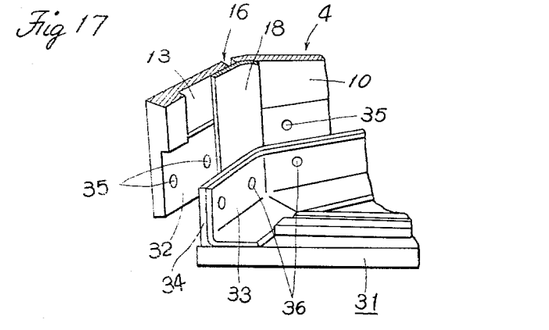

The connecting structure for the stern part 4 and a transom 31, shown in FIGS. 1 and 9, is illustrated in FIG. 17, wherein a projecting metal plate 33, abutting against the inner surface 32 of the stern part 4, is provided on and projects from adjacent the periphery of the transom 31. A resilient water seal strip 34 extends along the outer surface of plate 33. At the places where the rear end portion of the stern part 4 is opposed to the projecting metal plate 33, there are provided a plurality of holes 35 and 36, and it is so arranged that, as shown in FIG. 16, the connecting and clamping operation may be effected by means of bolts 27 and thumb nuts 30. At 61 (FIG. 9) is denoted a rear deck support.

Figure 4:
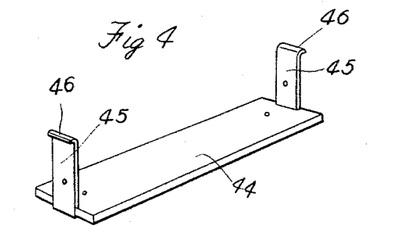
FIG. 4 is a perspective view of a seat board.
Figure 10:
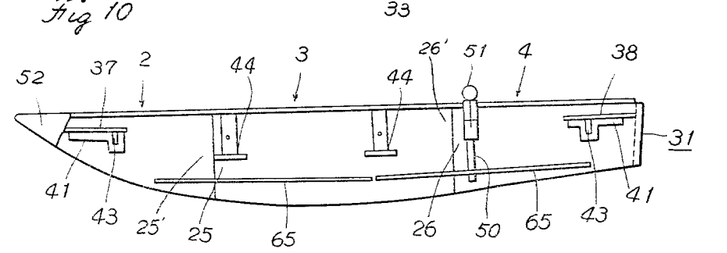
FIG. 10 is a schematic inside side elevational view of the whole assembly.
Figure 21:
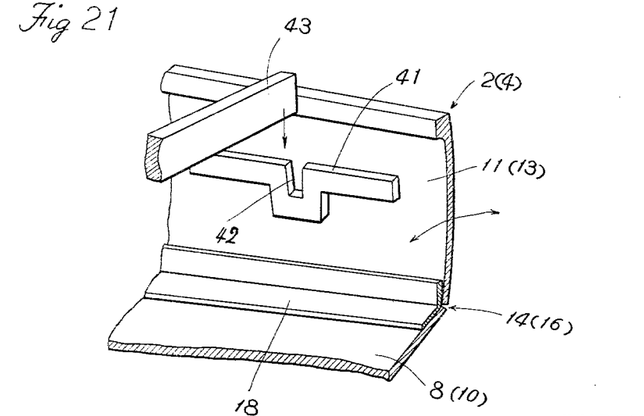
FIG. 21 is a perspective view of a deck mounting part.
Figure 22:
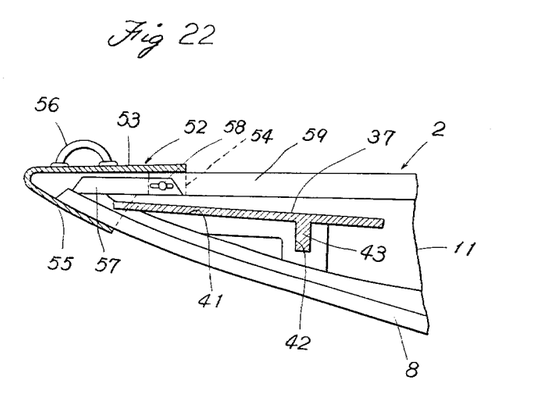
FIG. 22 is an inside elevational view, partly in longitudinal section, of the prow metal fittings.
Figure 23:
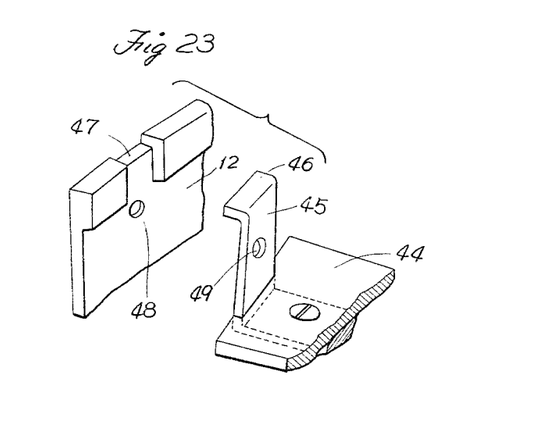
FIG. 23 is a perspective view of a seat board attaching part.

A front deck 37 and a rear deck 38 are provided with hinge joints 39 and 40, respectively along the lengthwise center line of the boat body, and are adapted to be folded double. These joints 39 and 40 may be composed of hinges or the like. As shown in FIGS. 10, 21 and 22, each of the side plates 11, 11 and 13, 13, on which said decks 37 and 38 are placed, has deck supports 41 provided with lateral frame supports 42 at opposed locations. Therefore, by allowing both ends of a lateral frame 43 to be engaged with opposed lateral supports 42 when the bow part 2 and the stern part 4 are expanded at each fold, it is possible to substantially maintain the configurations of the bow and the stern of the boat body and at the same time to place the decks 37, 38 on the lateral frame 43 and the deck support 41 in expanded condition. At the places nearer to both ends of the trunk part 3, there are provided seat boards 44, the attaching structure of which, shown in FIGS. 4 and 23, is as follows:

Secured to the lower side surfaces of both ends of each seat board are L-shaped metal fittings 45, 45 which project upwardly. The ends of these upwardly projecting L-shaped metal fittings are outwardly bent to provide hooks 46, 46.

Recesses 47, in which the hooks are to be fitted, are provided in the gunwales on the upper portion of the side plates 12. At the places where the side plates 12 are opposed to the L-shaped metal fittings, there are provided holes 48 and 49, so that, as already mentioned, the attaching and tightening may be effected by means of bolts 27 and thumb nuts 30.

Figure 2:
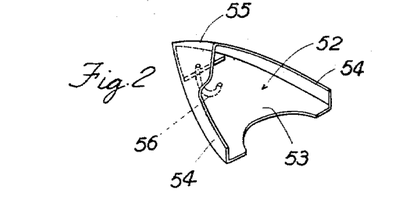
FIG. 2 is a perspective view of a prow fitting.
Figure 3:
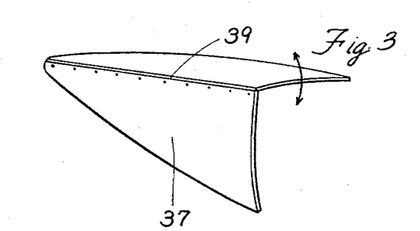
FIG. 3 is a perspective view of a front deck.
Figure 7:
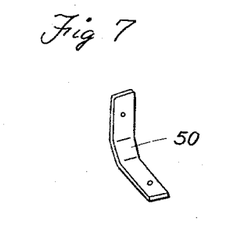
FIG. 7 is a perspective view of a reinforcing frame.
Figure 8:
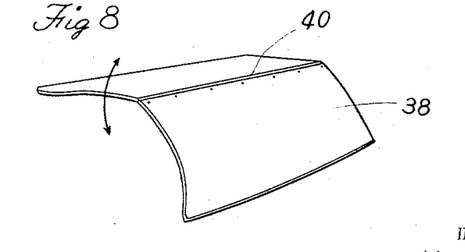
FIG. 8 is perspective of a rear deck.

A reinforcing frame 50, shown in FIG. 7, is attached by means of bolts and nuts to the junction between the side plate 13 and bottom plate 10 when the stern part 4 is expanded, as seen in FIG. 1. One of said bolts for attaching the reinforcing frame 50 will also at the same time serve to attach an oarlock 51 to the outer side surface of the side plate 13. Additional bolts may be utilized for perfectly securing the oarlock 51 to the side plate 13. When the bow part 2 is expanded, a metal prow fitting 52 is attached to the prow. As shown in FIGS. 1, 2 and 22, the metal prow fitting 52 consists of an upper plate 53, of substantially isosceles triangle shape in plan, side plates 54 extending from the two equal sides of the isosceles triangle and a bottom plate 55 interconnecting the foremost end portion of the side plates 54, said upper plate 53 being provided with a wire hook or anchor element 56 secured thereto.

In securing the metal prow fitting 52 to the boat body, the former is fitted over the prow 57 and then both prow fitting side plates 54 and boat side plates 11 are secured together by bolt and nut means 58. The metal prow fitting 52 also serves to anchor one end of a gunwale protecting member 59.

Figure 5:
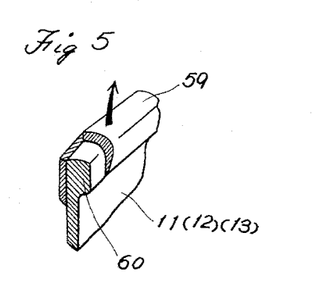
FIG. 5 is a perspective view, taken in longitudinal section, of an attaching part of a gunwale protecting member.
Figure 6:
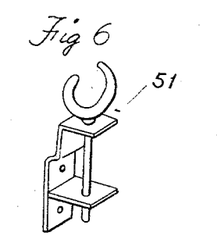
FIG. 6 is a perspective view of one of two oarlocks.

The gunwale protecting member 59 is a long element having a 7-shaped cross-section as shown in FIG. 5, and is composed of resilient material such as rubber or the like. Thus, the members 59 are fitted, from the stern side, over the upper edges 60 of the boat side plates 11, 12 and 13 of the boat body, which is in expanded and assembled condition as shown in FIG. 1, thereby serving to function for protecting the gunwale and covering the upper ends of the junctions 25 and 26 to provide smooth surfaces and improve the sense of finger-touch.

While the gunwale protecting members 59 thus fitted are freely removable, they will be firmly anchored by allowing their front end portions to be covered by the metal prow fitting 52 and permitting the bolts 58 to pass through a part of each of the prow protecting members 59 so as to effect mutual clamping.

At 62 is denoted oars whose blades 63 are adapted to be removed by means of bolt and nut means 64. 65 denotes floor boards adapted to be fitted in the bottom part of the boat body. The order of assembling the above-described boat is as follows.

(1) Transom 31 is attached to the stern part 4.

(2) Both stern part 4 and bow part 2 are expanded and then lateral frames 43 are respectively fitted therein.

(3) The three parts 2, 3 and 4 of the boat body are interconnected.

(4) L-shaped metal fittings 45, 45 are attached to the seat boards 44, 44 and then these assemblies are fitted in the trunk part 3 and secured thereto.

(5) Reinforcing frames 50 are attached and a pair of oarlocks 51, 51 are attached thereto.

(6) Front deck 37, rear deck 38 and floor boards 65 are fitted the boat body.

(7) Prow protecting members 59 are fitted thereover from the stern side.

(8) Metal prow fitting, 52 is attached, thereby completing the assembling.

Owing to the fact that the twofold water-proof resilient band-like elements 21 are strongly pressed by both side members A and B at the joints, and that the inner waterproof resilient band-like elements are provided, each joint of the assembled boat body 1 can be maintained in perfect water-tight condition, and also the junctures 25, 26 of the three boat parts 2, 3, 4 as well as the junctures of the transom 31 can be maintained in perfect water-tight condition since the water-tight resilient films 18 and 34 are pressed at these junctures. Further, since the assembled boat body 1 has its bends 5, 14, 15 and 16 presenting curves, the outer wall extending from the stern part and boat bottom to the boat sides at least defines a three-dimensional curved surface, thereby providing a streamlined boat having minimum resistance.

Disassemblage may be effected in the reverse order of that above mentioned.

After being disassembled, the three boat parts 2, 3, 4 and decks 37, 38 are collapsed flat along their respective bends, so that they may be superimposed and packed together with all other component parts of the boat to provide a single package. The three boat parts 2, 3 and 4 are collapsed in such a manner as to superimpose the boat side plates one upon another along their respective folds at the center of the boat bottom, while inwardly collapsing said boat side plates toward the boat bottom. At this time, since the bends or fold lines are such that they extend along two dimensional curves, the plates on either side of the bends are gradually transformed from their initial curved state into a flattened state as soon as the collapsing operation is started, and when this collapsing operation is completed they can be allowed to assume a perfectly flattened condition only by applying the force necessary for packing. Conversely, at the time of expanding operation the plates are each gradually curved and, when perfect expansion is attained, the plates define the three-dimensional curved surface, with the result that at least in one of the conditions where the portions on either side of said folding lines are collapsed or expanded, the joints will necessarily have internal stresses remaining therein. Thus, at least in one of said conditions, the materials can be maintained in tightened condition, whereby the structure in operative condition or in collapsed condition can be strengthened as if in the case with reinforced glass.

Particularly, if use is made of a method of production by means of which a plurality of members, each having at least one side edge thereof shaped to present a two-dimensional curve, are composed of non-bent relatively hard flat resilient plates, said curved side edges of said members being so constructed as to be capable of being collapsed and expanded in such a condition that they are interconnected at least at spaced location so that, when in expanded condition, the folds may be water-sealed while both side portions at the folds define a three-dimensional curved outer wall for a floating body, then both side portions at the folds, when in collapsed condition, easily tend to be superimposed one upon another to assume a flattened form. Yet, when in expanded condition, it is possible to necessarily cause internal stresses to remain in the material, thereby increasing the strength thereof when in use.

The increased strength of a boat body results in minimum vibration of the boat even if used in rough wavy water and also assures the boat body of the least possible distortion of the boat which may be caused at every time when the oars are used.

If the boat body is strong in collapsed condition, not any more than minimum vibration and noise will occur in conveying the boat body.

The present invention, when applied to a boat or other floating body whose resistance against propulsion is desired to be minimized, makes it possible to obtain collapsible floating body having such a nature that, in spite of the external force variably influencing the floating body with the lapse of time, deformation of the shape of the floating body will be a minimum, that in spite of collapsibility a desirable shape of minimum resistance against propulsion can be easily obtained in advance because it is possible to freely design the outer wall of a three-dimensional curved surface notwithstanding the presence of the bends, and that the whole structure is not only rugged and reliably practicable but also has an extremely high propulsive efficiency.

While the preferred form of the invention has been shown and described here, it is to be understood that the same is not so limited but shall cover and include any and all modifications of the invention which fall within the purview thereof.

What I claim is:

1. A collapsible floating body comprising, in combination, plural sections arranged for disengageable interconnection, at transversely extending connection lines, in end-to-end relation and with adjacent end portions in mating overlapped relation; each section comprising plate-like elements hinged together for folding and expanding, along substantially longitudinally extending fold lines; first water-tight resilient strips each extending throughout the length of a respective connection line and laterally to either side of the latter, each first resilient strip being secured in superposed relation to one surface of one of the two sections meeting at the associated connection line and, when such two sections are overlapped at their end portions, overlapping the corresponding surface of the other of said two sections; second water-tight resilient strips each extending throughout the length of a respective fold line of a respective section and laterally to each side of the latter, each second resilient strip being secured in superposed relation to the interior surfaces of the two plate-like elements hinged at the respective fold line; and means for clamping such adjacent end portions in tight engagement; whereby when the adjacent end portions are clamped in tight engagement, each of said first and second water-tight resilient strips is compressed to form seals preventing water leakage along said connection lines and said fold lines.

2. A collapsible floating body comprising, in combination, plural sections arranged for disengageable interconnection, at transversely extending connection lines, in end-to-end relation and with adjacent end portions in mating overlapped relation; each section comprising plate-like elements and hinges interconnecting the elements, for folding and expanding, along substantially longitudinally extending fold lines, said hinges being positioned in longitudinally spaced relation along the respective fold lines; first water-tight resilient strips each extending throughout the length of a respective connection line and laterally to either side of the latter, each first resilient strip being secured in superposed relation to one surface of one of the two sections meeting at the associated connection line and, when such two sections are overlapped at their end portions, overlapping the corresponding surface of the other of said two sections; and second water-tight resilient strips each extending throughout the length of a respective fold line of a respective section and laterally to each side of the latter, each second resilient strip being secured in superposed relation to the interior surfaces of the two plate-like elements hinged at the respective fold line; and means for clamping such adjacent end portions in tight engagement; whereby when the adjacent end portions are clamped in tight engagement, each of said first and second water-tight resilient strips is compressed to form seals preventing water leakage along said connection lines and said fold lines; each second water-tight resilient strip completely covering the hinges arranged along a respective fold line.

3. A collapsible floating body comprising, in combination, plural sections arranged for disengageable interconnection, at transversely extending connection lines, in end-to-end relation and with adjacent end portions in mating overlapped relation; each section comprising plate-like elements hinged together for folding and expanding, along substantially longitudinally extending fold lines; first water-tight resilient strips each extending throughout the length of a respective connection line and laterally to either side of the latter, each first resilient strip being secured in superposed relation to one surface of one of the two sections meeting at the associated connection line and, when such two sections are overlapped at their end portions, overlapping the corresponding surface of the other of said two sections; and second water-tight resilient strips each extending throughout the length of a respective fold line of a respective section and laterally to each side of the latter, each second resilient strip being secured in superposed relation to the interior surfaces of the two plate-like elements hinged at the respective fold line; means for clamping such adjacent end portions in tight engagement; whereby, when the adjacent end portions are clamped in tight engagement, each of said first and second water-tight resilient strips is compressed to form seals preventing water leakage along said connection line and said fold lines; and third water-tight resilient strips each extending throughout the length of a respective fold line of a respective section, each third resilient strip being secured to the adjacent edge surfaces of the two plate-like elements hinged at the respective fold line and, in the folded condition of the respective two plate-like elements, lying in a substantially flat plane; each third resilient strip, in the expanded condition of the respective two plate-like elements hinged at the respective fold line, and when the edge surfaces thereof are substantially parallel to each other, being folded on itself and compressed between the opposed edge surfaces and having a substantially U-shaped cross section.

4. A collapsible floating body, as claimed in claim 1, including a gunwale; and relatively elongated resilient gunwale protecting strip disengageably embracing the gunwale in the expanded or erected condition of said floating body, said protecting strips having a substantially inverted J-shape with the longer leg on the exterior surface of the expanded or erected floating body.

5. A collapsible floating body, as claimed in claim 1, wherein one of said sections is a pointed bow sections and said body includes side walls extending therealong, the upper edges of said side walls, considered in the expanded or erected condition of the body, being formed with gunwales; relatively elongated resilient gunwale protecting members disengageably embracing the gunwale in the erected or expanded condition of the floating body; a relatively rigid prow member engaged over the pointed end of said bow section, when the floating body is expanded or erected; said prow member overlying the end portions of said gunwale protecting members and the end portions of the fold lines of the bow section; and anchor means on said prow member for securing a wire, cable, or the like to said floating body.

References Cited by the Examiner

UNITED STATES PATENTS

| | | | |
|---|---|---|---|
| 1,793,617 | 2/1931 | Hudson | 9—2 |
| 1,916,486 | 7/1933 | Miller | 9—2 |
| 2,577,970 | 12/1951 | Larsson et al. | 9—2 |
| 3,056,976 | 10/1962 | Craft | 9—2 |
| 3,108,295 | 10/1963 | Schor et al. | 9—2 |
| 3,116,496 | 1/1964 | Straussler | 9—2 |
| 3,121,887 | 2/1964 | Baretta | 9—2 |

MILTON BUCHLER, *Primary Examiner.*

FERGUS S. MIDDLETON, *Examiner.*